United States Patent [19]

Marie et al.

[11] Patent Number: 4,672,425
[45] Date of Patent: Jun. 9, 1987

[54] MULTIPLEX TELEVISION SYSTEM ADAPTED TO TRANSMIT PICTURES WITH A 5/3 ASPECT RATIO, SYSTEM

[75] Inventors: Gérard J. M. Marie, Santeny-Villecresnes; Jean-Pierre C. Arragon, Roissy-en-Brie, both of France

[73] Assignee: U.S. Philips Corporation, New York, N.Y.

[21] Appl. No.: 750,394

[22] Filed: Jun. 28, 1985

[30] Foreign Application Priority Data

Jul. 3, 1984 [FR] France ................. 84 10511

[51] Int. Cl.⁴ ........................................... H04N 11/08
[52] U.S. Cl. ........................................ 358/12; 358/13
[58] Field of Search ................. 358/11, 12, 13, 145, 358/142

[56] References Cited

U.S. PATENT DOCUMENTS 4,233,628 11/1980 Ciciora ................................. 358/142
4,551,754 11/1985 Meise et al. ......................... 358/180

FOREIGN PATENT DOCUMENTS 8300269 1/1983 European Pat. Off. .............. 358/12
8402442 6/1984 European Pat. Off. .............. 358/13
8500492 1/1985 European Pat. Off. .............. 358/12

OTHER PUBLICATIONS

Broder Wendland, "Enhanced Picture Quality by Timeplex Techniques", SMPTE Journal, Oct. 1983, pp. 1034-1035.

Tom Robson, "A Compatible High Fidelity TV Standard for Satellite Broadcasting", 16th Annual SMPTE Television Conference, Tomorrow's Television, Feb. 1982, pp. 218-236.

Primary Examiner—Michael A. Masinick
Attorney, Agent, or Firm—Thomas A. Briody; Jack Oisher; William J. Streeter

[57] ABSTRACT

Television system in which the digital data, the chrominance signals and the luminance signals are time-division multiplexed. This system, adapted for transmitting pictures having an aspect ratio of approximately 5/3, is such that the compatibility with receivers capable of receiving and processing the signal in accordance with the MAC system with an aspect ratio of 4/3 is ensured without any change in the instantaneous digital flow rate, nor in the compression factor of the video signals. In addition, the horizontal extension of the picture to the aspect ratio 5/3 is obtained by reducing the length of the data burst preceding the video signals and by suppressing a certain number of video lines located at top and/or at bottom of the picture, in order to make it possible to place the data suppression in the bursts in the position of these video lines and within a certain number of previously non-utilized line periods during the field retrace.

15 Claims, 2 Drawing Figures

MULTIPLEX TELEVISION SYSTEM ADAPTED TO TRANSMIT PICTURES WITH A 5/3 ASPECT RATIO, SYSTEM

FIELD OF THE INVENTION

The present invention relates to a television system comprising at least a transmitter and at least a receiver, the transmitter comprising an encoding circuit for time-division multiplexing of video and digital data signals and for transmitting the multiplexed signal obtained, this signal being such that during line periods a data burst precedes the video signals, the receiver comprising a decoding circuit adapted for producing video signals comprising information which predominantly corresponds to the video information applied to the encoding circuit, the encoding and decoding circuits being such that on reception the displayed picture has an aspect ratio of approximately 5/3, the instantaneous digital flow rate and the compression factor of the video signals being in accordance with the MAC television system standard as regards the 4/3 aspect ratio of the picture, and the length of the data burst being shorter than in said standard.

The invention also relates to a transmitter capable of transmitting the signal in accordance with such a system, an interface device capable of receiving and processing this signal and a television receiver comprising such an arrangement.

BACKGROUND OF THE INVENTION

Improving the resolution of television pictures will be accompanied by a change in the size of the picture to approach the aspect ratios used for cine pictures. For a high-definition television system (HDTV), an aspect ratio of 5/3 is recommended in Japan. Other proposals even specify still higher values (5.3/3 or 5.5/3, for example).

In Europe, where the number of television channels is very limited, (for example, for transmission by satellite, only five channels per nation in the 12 GHz band), because of the large number of countries and of different languages, it is very important to ensure compatibility between the new intended aspect ratio and the existing 4/3 aspect ratio which will anyway ensure the majority of programs till the end of the century. Compatibility is here understood to mean that the first generation receivers can receive of course with the 4/3 aspect ratio as well as, the new transmissions with a 5/3 aspect ratio.

T. J. Long of the IBA has proposed such a system in a paper presented to the Montreux Symposium 1983 ("Why HDTV!", T. J. Long, Independent Broadcasting Authority, United Kingdom, pages 27-47) in the case of an initial standard of the C-MAC type. To arrive at the 5/3 aspect ratio without loss in picture height, he recommends two means:

(a) reducing the duration of the data burst to 20 Mb/s at the beginning of each line, from 10 μs to approximately 3 μs which results in only one stereo program instead of 8 sound channels, this reduction rendering it possible to bring the number of samples of the chrominance signal C and of the luminance signal Y from 350 to 400 and from 700 to 800, respectively, which results in a 4.6/3 aspect ratio;

(b) to obtain the aspect ratio 5/3, transmitting 80 additional samples Y and 40 additional samples C corresponding to both extreme left and right edges of the picture during line periods which are free during the field retrace periods.

The compatibility of this system will be ensured when first generation MAC receivers which operate in the 4/3 aspect ratio are used provided that, in these receivers, there is a possibility of changing the duration of the data burst, the position of the read period of the alignment level which provides the reference of the average grey level, and the beginning and the end of the periods of storing the samples C and Y in the memory. In the C-MAC system defined in the second revised version of the standard SPB 284 (June 1983) of the European Broadcasting Union (EBU), all these information components are contained in line 625, and consequently there are no inherent difficulties to provide this compatibility. It is, however, possible to utilize simpler solutions, for example reading some bits only which will indicate that a change to the 5/3 aspect ratio is being made, it being possible for these few bits to be situated either in line 625 (in SDF SCR, example, S D F S C R of the Static Data Frame Service Configuration Reference, being a word, defined by the standard which itself defines the configuration of the services or in MVSCG, M V S C G, of the Multiplex and Video Scrambling Control Group, which is also a word, defined by the standard which describes the physical organization of the signal) or in the special path of the sound/data multiplex conveyed by packets having the address zero (in VCONF, for example V C O N F of the Video Configuration, being a word, defined by the standard describing the configuration of the video signal). Knowing this, one might enter the boundaries of the different intervals for data, alignment level, chrominance and luminance into a read-only memory (ROM). It would furthermore be possible to provide this ROM in such a way that it is interchangeable such that it is not necessary to have all the characteristics of the second generation system specified already, at the 5/3 aspect ratio, before starting the manufacture of the first generation receivers, with the 4/3 aspect ratio. It is, however, possible to express two types of criticism as regards the solution proposed by the IBA:

(a) reducing the duration of the data burst reduces the capacity of the digital path by a ratio of 4, which is already much in a C-MAC system using an instantaneous 20 Mb/s rate, since this leaves only one stereo channel, but it becomes unacceptable for a D2-MAC system utilizing an instantaneous rate of 10 Mb/s, as this would leave only one single mono channel;

(b) the transmission of the additional samples during line periods necessitates the use of large-capacity fast memories and poses inter alia the problem that transitions become visible at the left and right of the picture, which transitions may appear from the moment the transmission channel introduces a signal distortion due to, for example, limitation of the passband or due to echo phenomena.

SUMMARY OF THE INVENTION

The invention has for its object to obviate these disadvantages. To this end, the invention relates to a television system such as defined in the opening paragraph of this description, characterized in that the multiplexed signal is such that the data not present in the bursts are transmitted during a certain number of line periods which are not utilized during the field retrace in the case of said standard.

Advantageously, the television system according to the invention may further be characterized in that furthermore data not contained in the bursts are transmitted during a certain number of line periods located at the beginning and/or at the end of the field period, which are occupied by video signals in the case of said standard. In these operations, reducing the length of the data bursts results in a duration less than or equal to 3 μs, which duration may even be zero, and the transmission of data occurs in the line periods which are unoccupied during the field retrace and also in line periods which contain the information components corresponding to the top and/or the bottom of the picture when transmission is effected with a 4/3 aspect ratio.

This solution does not require a high-capacity fast memory as does stage (b) of the solution proposed by the IBA. As regards the sound and the data, it is possible to calculate that at the limit, that is to say when the line containing the video information components does not contain data anymore with the possible exception of some line synchronizing bits, a memory of 10 Kbits per sound channel is sufficient to ensure the distribution of audio signals during the 20 lines following after each field retrace period. Since the second revised version of the standard SPB 284 of the EBU provides for a memory of 16 kbits for each demodulated sound channel, no additional memory is thus necessary.

The particulars and advantages of the invention will become apparent in greater detail from the following drawing wherein:

DETAILED DESCRIPTION OF THE INVENTION

Figure 1:
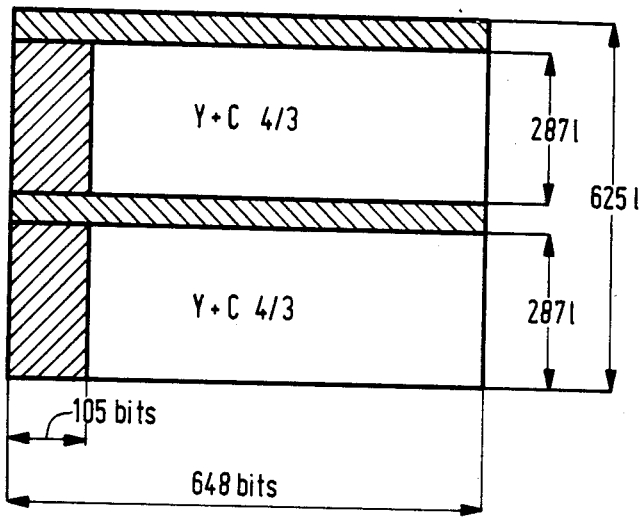
FIG. 1 shows a 625 line picture having a 4/3 aspect ratio.

An example is given of a system adapted to the D2-MAC case, but which might be used with equal advantage for C-MAC or for B-MAC. Reference is made to the Figures in which the television signal is shown schematically for the two fields which form a 625-line picture:

| D2-MAC with a 4/3 aspect ratio (see FIG. 1): | |
|---|---|
| useful video lines per picture | 574 |
| lines reserved for different information components | 5 |
| Teletext or Antiope lines | 18 |
| lines utilized completely by the data channel | 28 |
| | 625 lines |
| data bursts of (624-28) lines: 5 or 6 synchronizing bits + 99 data bits. | |

As a line which is completely utilized by the data may, for example, contain 6 synchronizing bits and 642 data bits, the capacity of the data multiplex is: (642×28)+(596×99)=76,980, that is to say 102 packets of 751 bits+378 unused bits, consequently a capacity which is sufficient for 5 high-quality sound channels.

Figure 2:
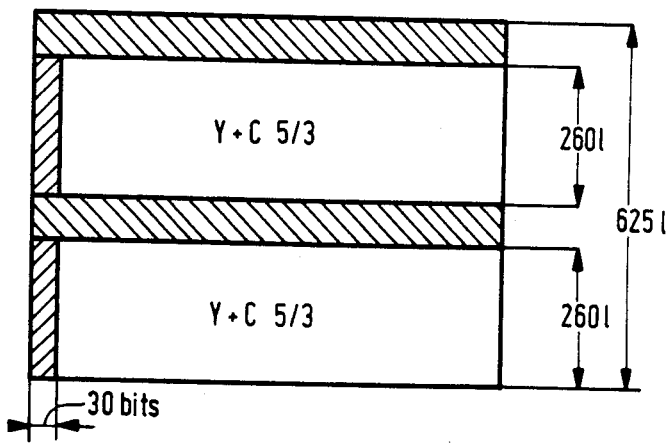
FIG. 2 shows a 625 line picture having a 5/3 aspect ratio.

| D2-MAC in the 5/3 aspect ratio (see FIG. 2): | |
|---|---|
| useful video lines per picture | 520 (loss 9.4%) |
| lines reserved for different information | 5 |
| components | |
| lines utilized completely by the data channel | 100 |
| | 625 lines |
| data bursts of (624-100) lines: 5 or 6 synchronizing bits + 24 data bits. | |

The capacity of the data multiplex is: (642×100)+(524×24)=76,776, or 102 packets of 751 bits+174 unused bits.

Recovering 99−24=75 data bits per burst, at 10 Mb/s, corresponds to 150 video samples, or 100 samples for the luminance Y in addition to the approximately 700 samples of the 4/3 aspect ratio and 50 samples for the chrominance C. Taking account of the reduction in the height of the picture, the exact ratio is equal to:

$$\frac{4}{3} \times \frac{800}{700} \times \frac{574}{520} = \frac{5.05}{3}.$$

It is necessary that on reception information is received about the aspect ratio of the picture being transmitted. To that end, identification of the aspect ratio may be supplied by certain bits of line 625, for use by an interface device which may be included in the television receiver and is intended to allow the reception of television pictures transmitted in accordance with the above-described system. This arrangement comprises in addition a read-only memory (ROM) which indicates the exact time limits of the different signals in the new standard.

It will be obvious that variants are possible. More specifically it is possible to reduce the useful data of the burst to zero during the video signals. To maintain the capacity of 5 high-quality sound channels, it is then necessary to use 120 complete lines for the data, which results in a vertical loss of 13% and in an aspect ratio of 5.45/3.

The same solutions are of course equally applicable to C-MAC. In this case, the capacity of 8 sound channels without Teletext is maintained, for example, with a loss of 7% in picture height and a 5/3 aspect ratio or with a loss of 9% in picture height and a 5.2/3 aspect ratio.

It is equally possible to decrease the loss in the vertical direction of the picture at the cost of sound channels suppression. In D2-MAC the reduction to 3 or 4 sound channels would reduce the loss in height to 5 and 7%, respectively and, in C-MAC, the reduction to 6 sound channels would, for example, reduce the loss in height to 5% at a 5/3 aspect ratio.

To prevent the portion lost at top and at bottom of the picture from becoming visible on the receivers operating with an aspect ratio of 4/3, it is sufficient for these receivers to be provided, from the beginning, with a device for adjusting the chrominance signal to zero level and the luminance signal to a black or grey level when digital data occupy the place of the video signals. This control can be obtained by either reading the information components of the line 625, or by reading those of the ROM, or otherwise by directly detecting the presence of digital signals in the relevant lines.

In accordance with a further characteristic of the invention and with the object of reducing the loss in picture height or avoiding the decrease in the number of transmitted sound channels, it is possible to diminish the horizontal or vertical resolution on the right and left edges of the picture which are added when a change is made from the aspect ratio 4/3 to the ratio 5/3. The simplest means to accomplish this is to sample these picture edges at a lower rate. Sampling at half the sampling rate, for example, that is to say with a rate of 6.76 MHz for the luminance and 3.375 MHz for the chrominance, results in half the horizontal resolution at these picture edges. To avoid too large a difference in resolution between the edges and the central portion, it is, for example, possible to effect a sampling operation alternately, that is to say that only half the number of samples is transmitted by alternately choosing from line to line the even samples and thereafter the odd samples for the luminance and from pairs of lines to pairs of lines for the chrominance. In this case a horizontal resolution of the edges is obtained on reception which is equal to the horizontal resolution in the center, by combining consecutive line information components for the luminance and from pairs of lines to pairs of lines for the chrominance. To prevent this mode of processing from diminishing the vertical resolution of the picture edges, it is possible to use a circuit for detecting a change in the picture in the vertical direction, such that the said processing operation needs only to be effected in the picture edge portions which do not comprise important vertical transitions.

It is also possible to combine geometrically consecutive line information components belonging to two consecutive fields, by using field memories comprising only the information components of the picture edges and by stopping this processing operation as soon as motion is detected in the relevant portion of the picture edges.

The following example, namely the case of a D2-MAC system with an aspect ratio of 5/3 with reduced resolution at the edges, will show the importance of this reduction by a factor of 2 of the transmitted density of the picture edge samples:

| | |
|---|---|
| useful video lines per picture | 544 (loss 5.2%) |
| lines reserved for different information components | 5 |
| lines utilized completely by the data channel | 76 |
| | 625 |
| data bursts of (624-76) lines: 5 or 6 synchronizing bits + 51 data bits. | |

The capacity of the data multiplex is: $(642 \times 76) + (548 \times 51) = 76,740$, i.e. 102 packets of 751 bits + 138 unused bits, consequently a capacity which is sufficient for 5 high-quality sound channels.

Recovering $99 - 51 = 48$ data bits per burst corresponds, when sub-sampling is effected with a factor $\frac{1}{2}$, to 192 video samples, that is to say 128 samples for Y and 64 samples for C. Taking account of the reduction in the picture height, the aspect ratio is equal to:

$$\frac{4}{3} \times \frac{828}{700} \times \frac{574}{544} = \frac{4,99}{3}.$$

In the case in which one is satisfied with only 4 high-quality sound channels, the loss in picture height will not be more than 2.4%. For 6 sound channels the loss in picture height will be 8.4%.

What is claimed is:
1. A television system comprising:
   at least one transmitter and receiver, the transmitter including:
   an encoding circuit for time division multiplexing of a video signal representing a picture having a 5/3 aspect ratio and digital data signals, and for transmitting the multiplex signal, said multiplex signal comprising a data burst preceding the video signal line periods, and an additional data component transmitted during first line periods not utilized during field retrace in the MAC standard video broadcasts, the data being further transmitted during second line periods at at least one end of a field period which occurs at an end of a video picture signal in MAC standard, the instantaneous digital flow rate and the compression factor of the video signals having a 5/3 aspect ratio being the same as that used with a MAC television standard having a 4/3 aspect ratio, the length of the data burst being shorter than that of the data burst sent in said MAC standard; and
   a decoding circuit for producing video signals having information corresponding to video information applied to the encoding circuit whereby a video signal representing a picture having an aspect ratio of approximately 5/3 is displayed.
2. The television system according to claim 1, wherein the picture comprises side edges, the video signal sampling rate for the edges being lower than the MCA standard sampling rate for the center portion of the picture.
3. The television system according to claim 1, wherein the multiplexed signal contains in the last line of each picture information for identifying the aspect ratio of the picture.
4. The television system according to claim 3, further comprising:
   an interface device for receiving and processing the signal transmitted by the transmitter when the signal contains in the last line of each picture information for identifying the aspect ratio of the picture; wherein the device comprises:
   a picture aspect ratio identification circuit for reading the identification information; and
   a memory means for indicating the time limits of luminance signals, chrominance signals and the digital data signals.
5. The television system according to claim 4, further comprising:
   means for receiving and processing the signal transmitted by the transmitter; the receiving and processing means comprising:
   a circuit for adjusting the luminance signals to a black or gray level and the chrominance signals to zero during the line periods in which the digital data are transmitted as substitutes of transmitted MAC standard video signals.
6. The television system according to claim 4, further comprising:
   means for receiving and processing the signal transmitted by the transmitter, the receiving and processing means comprising:
   a circuit for detecting a change in the picture in the vertical direction; and
   a circuit for combining the luminance signals of consecutive lines and the chrominance signals from line pairs to line pairs when a vertical transition less than a predetermined value is detected in the side edges of the picture.
7. The television system according to claim 4, further comprising:

means for receiving and processing the signal transmitted by the transmitter, the receiving and processing means comprising:
a motion detection circuit;
a circuit for combining video signals of geometrically consecutive lines in the picture, the video signals belonging to two consecutive fields when motion is not detected in the relative portion of the picture side edges.

8. In a television system having at least one transmitter and receiver, the transmitter including an encoding circuit for time-division multiplexing of video and digital data signals and for transmitting the multiplexed signal, a data burst preceding the video signals of the multiplexed signal during line periods, the receiver including a decoding circuit for producing video signals having information predominantly corresponding to video information applied to the encoding circuit, the instantaneous digital flow rate and the compression factor of the video signals being the same as a picture with a 4/3 aspect ratio in accordance with the MAC television standard, the length of the data burst being shorter than that of the standard, a method of displaying a picture having an aspect ratio of approximately 5/3 comprising the steps of:
transmitting data not present in the bursts during first line periods which are not utilized during field retrace in the MAC standard;
further transmitting the remaining data during second line periods at at least one end portion of a field period corresponding to the end portion being occupied by video signals in MAC standard pictures.

9. The method according to claim 8, further comprising:
sampling the video signals at side edges of the picture at a rate lower than the MAC standard sampling rate for the center portion of the picture.

10. The method according to claim 9, further comprising:
transmitting only half the number of video signals sampled from the side edges by alternately choosing for transmission even sampled signals and thereafter odd sampled signals, from line to line for luminance signals and from line pairs to line pairs for chrominance signals.

11. The method according to claim 8, further comprising:
identifying the aspect ratio of the picture from the last line of each picture.

12. The method according to claim 8, further comprising:
receiving and processing the signal transmitted by the transmitter when the signal contains in the last line of each picture information for identifying the aspect ratio of the picture, the receiving and processing step comprising:
reading the identification information;
indicating the respective time occurrence of luminance signals, chrominance signals and the digital data signals.

13. The method according to claim 12, further comprising:
receiving and processing the signal transmitted by the transmitter, the receiving and processing step comprising:
adjusting the luminance signals to a black or gray level;
adjusting the chrominance singals to zero during line periods in which the digital data are transmitted as substitutes of transmitted MAC standard video signals.

14. The method according to claim 12, further comprising:
receiving and processing the signal transmitted by the transmitter, the receiving and processing step comprising:
detecting a change in the picture in the vertical direction; and
combining luminance signals of consecutive lines and chrominance signals from line pairs to line pairs when a vertical transaction less than a predetermined value is detected in the side edges of the picture.

15. The method according to claim 12, further comprising:
receiving and processing the signal transmitted by the transmitter, the receiving and processing step comprising:
detecting motion in the picture;
combining video signals of geometrically consecutive lines in the picture, the video signals belonging to two consecutive fields when motion is not detected in the relative portion of the picture side edges.

* * * * *